(12) United States Patent
Smychkovich et al.

(10) Patent No.: US 9,712,227 B2
(45) Date of Patent: *Jul. 18, 2017

(54) RADIO FREQUENCY REPEATER SYSTEM FOR SIGNAL TRANSMISSION THROUGH RADIO FREQUENCY SHIELDING MATERIAL

(71) Applicant: AT&T Intellectual Property I, L.P., Atlanta, GA (US)

(72) Inventors: Boris Smychkovich, Alpharetta, GA (US); John Dyal, Acworth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,035

(22) Filed: Oct. 24, 2016

(65) Prior Publication Data

US 2017/0149488 A1 May 25, 2017

Related U.S. Application Data

(63) Continuation of application No. 14/952,128, filed on Nov. 25, 2015, now Pat. No. 9,479,244.

(51) Int. Cl.
  *H04B 7/00* (2006.01)
  *H04W 4/00* (2009.01)
  (Continued)

(52) U.S. Cl.
  CPC ............... *H04B 7/15* (2013.01); *H04W 4/005* (2013.01); *H04W 40/22* (2013.01)

(58) Field of Classification Search
  CPC ..... H04W 28/18; H04W 24/00; H04W 24/10; H04W 74/0808; H04W 88/04; H04B 10/07; H04B 10/1149
  See application file for complete search history.

(56) References Cited

U.S. PATENT DOCUMENTS 5,224,126 A * 6/1993 Myers ................ H04L 25/4904
  327/166
6,927,688 B2 8/2005 Tice
  (Continued)

OTHER PUBLICATIONS

Poor et al., "Reliable Wireless Networks for Industrial Systems," Technical White Paper, 2002, Ember Corporation.
(Continued)

*Primary Examiner* — Bobbak Safaipour
(74) *Attorney, Agent, or Firm* — Hartman & Citrin LLC

(57) ABSTRACT

A radio frequency ("RF") repeater system can receive, from a connected home device, an original RF signal that is unable to propagate through an object. The RF repeater system can demodulate the original RF signal to extract a data stream that includes data captured by the connected home device, can change an original data rate of the data stream to a new data rate that matches an ultrasonic frequency capable of propagating through the object thereby creating an ultrasonic data stream, can transmit, by a first surface transducer, the ultrasonic data stream through the object to a second surface transducer, can receive, by the second surface transducer, the ultrasonic data stream, can change the data stream from the new data rate back to the original data rate, can modulate the data stream to create a new RF signal, and can transmit the new RF signal towards the destination.

20 Claims, 9 Drawing Sheets

(51) Int. Cl.
  *H04B 7/15* (2006.01)
  *H04W 40/22* (2009.01)

(56) References Cited

U.S. PATENT DOCUMENTS

| | | | |
|---|---|---|---|
| 7,126,552 B2 | 10/2006 | Locatelli et al. | |
| 7,629,943 B2 | 12/2009 | Tuttle | |
| 8,344,829 B2 | 1/2013 | Miller, II et al. | |
| 9,112,547 B2* | 8/2015 | Scheinert | H04B 7/022 |
| 9,252,877 B1* | 2/2016 | Lee | H04M 1/72527 |
| 9,479,244 B1* | 10/2016 | Smychkovich | H04B 7/15 |
| 2004/0066326 A1 | 4/2004 | Knapp | |
| 2008/0010661 A1* | 1/2008 | Kappler | H04L 65/80 725/120 |

OTHER PUBLICATIONS

Abrudan et al., "Indoor Location Estimation and Tracking in Wireless Sensor Networks using a Dual Frequency Approach," 2011 International Conference on Indoor Positioning and Indoor Navigation (IPIN), Sep. 21-23, 2011, IEEE.

Sarin Kumar et al., "High-frequency surface acoustic wave device based on thin-film piezoelectric interdigital transducers," Applied Physics Letters, Sep. 6, 2004, pp. 1757-1759, vol. 85, No. 10.

Bielinski et al., "Transceiver Design for High Data Rate Through-Metal Communication in Naval Applications," Naval Engineers Journal, Mar. 1, 2013, vol. 125, No. 1, pp. 121-126, American Society of Naval Engineers.

Yahalom et al., "Transmission through Single and Multiple Layers in the 3-10 GHz Band and the Implications for Communications of Frequency Varying Material Dielectric Constants," WSEAS Transactions on Communications, Dec. 2010, Issue 12, vol. 9, pp. 759-772.

U.S. Notice of Allowance dated Jun. 7, 2016 in U.S. Appl. No. 14/952,128.

* cited by examiner

RADIO FREQUENCY REPEATER SYSTEM FOR SIGNAL TRANSMISSION THROUGH RADIO FREQUENCY SHIELDING MATERIAL

CROSS-REFERENCE TO RELATED APPLICATIONS

This application is a continuation of and claims priority to U.S. patent application Ser. No. 14/952,128, entitled "Radio Frequency Repeater System for Signal Transmission Through Radio Frequency Shielding Material in Connected Home Applications," filed Nov. 25, 2015, now U.S. Pat. No. 9,479,244, which is incorporated herein by reference in its entirety.

BACKGROUND

Radio frequency ("RF") signal repeaters are devices that include an RF receiver and an RF transmitter. A radio repeater receives signals via the radio receiver and repeats the signals via the radio transmitter. Some radio transmitters include a power amplifier to boost power levels of signals thereby increasing the distance that the signals can travel.

RF signals travel well in open air spaces, in areas with a clear line of sight to the signal destination, and around walls and other objects that do not absorb or shield RF signals. Some objects, such as those made at least partially out of metal or concrete, can absorb or shield signals, resulting in signal attenuation that limits or completely destroys the signals.

SUMMARY

Concepts and technologies are disclosed herein for an RF repeater system for signal transmission through RF shielding material in connected home applications. According to one aspect of the concepts and technologies disclosed herein, the RF repeater system can receive an original radio frequency signal from a connected home device. The connected home device can operate to provide, at least in part, a connected home service to one or more users. The connected home service can be or can include a home automation service or a home security service. The original RF signal is unable to propagate through an object to a destination to which the connected home device intends to send the original RF signal. The object can include a first surface upon which a first surface transducer of the RF repeater system is attached and a second surface upon which a second surface transducer of the RF repeater system is attached. The RF repeater system can demodulate the RF signal to extract a data stream that includes data captured by the connected home device. The RF repeater system can change an original data rate of the data stream to a new Manchester encoded data stream with an ultrasonic data rate capable of propagating through the object thereby creating an ultrasonic data stream. The RF repeater system can transmit, by the first surface transducer, the ultrasonic data stream through the object to the second surface transducer. The RF repeater system can receive, by the second surface transducer, the ultrasonic data stream from the object. The RF repeater system can change the ultrasonic data stream from the new Manchester encoded data stream with the ultrasonic data rate back to the original data rate. The RF repeater system can modulate the data stream to create an RF signal and can transmit the RF signal towards the destination.

The object can be or can include any object that is made at least partially of a material that prevents or at least reduces the efficacy of RF signal propagation therethrough. In other words, the object can provide at least partial RF shielding to RF signals. In some embodiments, the object includes a wall at least partially composed of a material such as metal and/or concrete. It should be understood, however, that additional or alternative materials are contemplated provided the materials have RF shielding attributes such as described above.

The connected home device can include one or more sensors, such as, for example, a smoke detector, a motion detector, a vibration sensor, an orientation sensor, a door sensor, a window sensor, a window break sensor, an outlet controller sensor, a water leak sensor, a fall detector, a flood detector, an alarm sensor, an environment control sensor, a carbon monoxide detector, a medication dispenser sensor, an entry/exit detector, a natural gas detector, a pressure sensor, an occupancy sensor, a smart home device sensor, a temperature sensor, a humidity sensor, a doorbell sensor, a multipurpose sensor that combines two or more sensors, the like, and/or combinations thereof. The sensor(s) can be utilized, at least in part, to provide sensor data (e.g., data indicative of motion detection, a door being opened, smoke or carbon monoxide present, a doorbell ring, and/or the like) for use in providing the connected home service to one or more users. Moreover, the connected home device sensor(s) can be or can include sensors designed for home automation and/or home security.

In some embodiments, the RF signal system transmits the RF signal towards the destination, which includes a connected home controller. In some other embodiments, the RF signal system includes a plurality of nodes, a first node of which transmits the RF signal to a second node acting as the destination. The second node can provide the RF signal through one or more objects in a similar manner as described above towards the connected home controller.

Each node in the RF repeater system can include a plurality of hardware components configured in accordance with a circuit designed to perform the aforementioned operations. In some embodiments, the circuit utilizes one or more commercial off-the-shelf ("COTS") components, including one or more integrated circuits, one or more RF receivers, one or more RF transmitters, one or more power amplifiers, one or more differential amplifiers, one or more data slicers, one or more surface transducers, one or more resistors, one or more capacitors, one or more power sources, one or more light emitting diodes ("LEDs"), and the like. The circuit alternatively can be encoded in software and executed by a processor of the RF frequency repeater system. The circuit alternatively can be embodied as an application-specific integrated circuit ("ASIC"). The circuit alternatively can be embodied as a field-programmable gate array ("FPGA"). Moreover, those skilled in the art will appreciate the wide range of circuit designs that can be configured to perform the aforementioned operations. As such, any particular design elements described herein are not intended to be limiting in any way.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
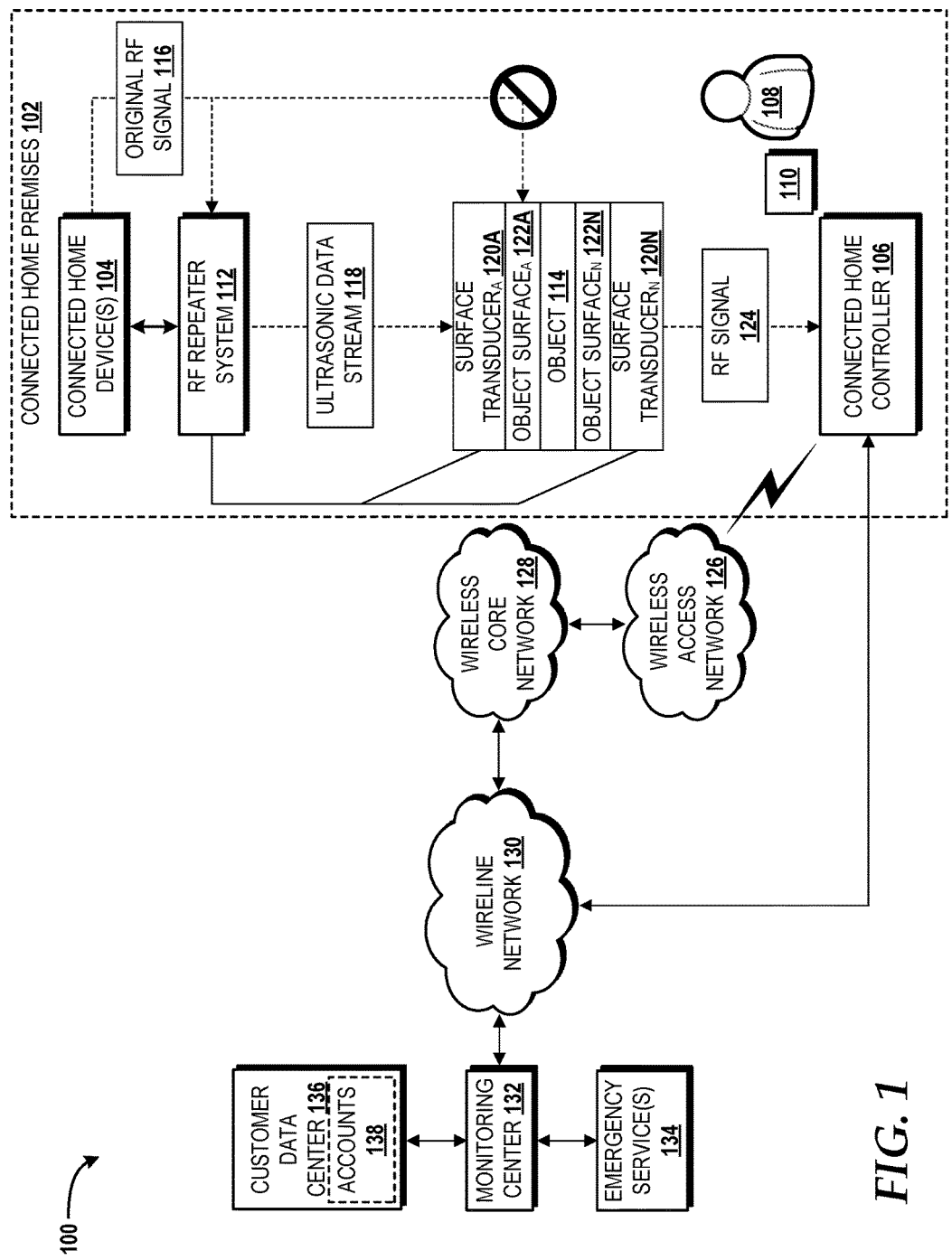
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of an ultrasonic mesh network system will be presented.

Referring now to FIG. 1, aspects of an illustrative operating environment 100 in which various embodiments presented herein may be implemented will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a connected home premises 102. The connected home premises 102 will be described herein as a residential structure such as a single-family home, duplex, triplex, condominium, apartment, or the like. It should be understood, however, that the concepts and technologies disclosed herein can be applied to other premises that might be or might include outdoor environments, stadiums, tents and other temporary structures, parking garages, commercial buildings, outdoor sales events, festivals, concerts, retail stores, restaurants, and/or the like.

The illustrated connected home premises 102 includes one or more connected home devices 104 that can be controlled by a connected home controller 106 to provide a connected home service for a user 108 who is associated with a user device 110 capable of communicating with the connected home controller 106 to enable the user 108 to interact with the connected home device(s) 104. The connected home service can be or can include a security service and/or a home automation service. The connected home service can be a monitored or an unmonitored service.

The illustrated connected home device(s) 104 can be or can include a motion sensor, a vibration sensor, an orientation sensor, a door sensor, a window sensor, a window break sensor, an outlet control sensor, a water leak sensor, a temperature sensor, a humidity sensor, a smoke detector sensor, a carbon monoxide detector sensor, an alarm sensor, a doorbell sensor, a multipurpose sensor that combines two or more sensors, the like, and/or combinations thereof. The connected home device(s) 104 can be utilized, at least in part, to provide sensor data (e.g., data indicative of motion detection, a door being opened, smoke or carbon monoxide present, a doorbell ring, and/or the like) for use in providing the connected home service to the user 108.

The illustrated connected home premises 102 also includes an RF repeater system 112. The RF repeater system 112 facilitates transmission of data originating from the connected home device(s) 104 to the connected home controller 106 through one or more objects 114. The object(s) 114 can be or can include any object that is made at least partially of a material that prevents or at least reduces the efficacy of RF signal propagation therethrough. In other words, the object(s) 114 can provide at least partial RF shielding to RF signals. In some embodiments, the object 114 includes a wall at least partially composed of a material such as metal and/or concrete. It should be understood, however, that additional or alternative materials are contemplated provided the materials have RF shielding attributes such as described above.

More particularly, the RF repeater system 112 can receive one or more RF signals, such as an original RF signal 116, from the connected home device(s) 104 and demodulate the original RF signal 116 to extract corresponding data stream(s) containing the data provided by the connected home device(s) 104. It should be understood that the RF signals, such as the original RF signal 116, can include any other data that the connected home device 104 intends to send to the connected home controller 106 or elsewhere through one or more objects such as the object 114.

The RF repeater system 112 also can change an original data rate of the data stream to a new Manchester encoded data stream with an ultrasonic data rate (e.g., 22,000 Hertz or other ultrasonic frequency) thereby creating an ultrasonic data stream 118. Manchester coding is a type of encoding in which each data bit has at least one transition and occupies the same time. The RF repeater system 112 also can amplify and send the ultrasonic data stream 118 through the object 114 by way of a surface transducers 120A that is physically attached (e.g., via adhesive, tape, screws, bolts, nails, putty, combinations thereof, and/or the like) to a surface ("object surfaces") 122A to another surface transducerN 120N that is physically attached to another surface ("object surfacers") 122N. This process can repeat as necessary to propagate the ultrasonic data stream 118 through the object 114. The RF repeater system 112 can recover the data from the ultrasonic data stream 118 and can send the data to an RF modulator (also not shown) that creates an RF signal 124 with the original data rate for transmission to the connected home controller 106. In this manner, the connected home device(s) 104 can transmit data through one or more walls and/or other objects/obstacles within the connected home premises 102. This concept finds particular, although not exclusive, application in buildings that are constructed, at least in part, with concrete, metal, and/or other RF shielding material, therefore making is difficult or impossible for the connected home device(s) 104 to provide data to the connected home controller 106, which often will not be in line of sight of the connected home device(s) 104 or in shared open air space.

Figure 9:
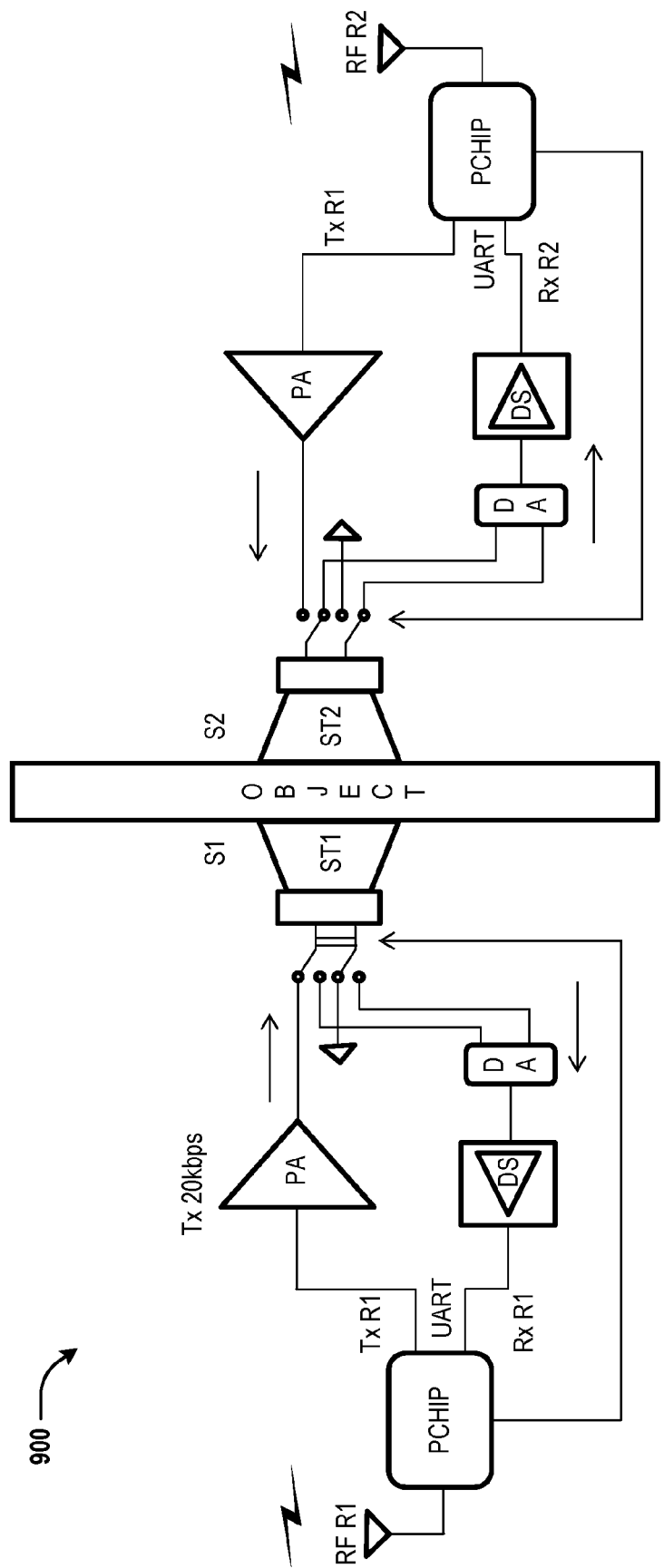
FIG. 9 is a block diagram illustrating an example circuit design for an RF repeater system, according to an illustrative embodiment.

Although only one object is shown in the illustrated embodiment, the ultrasonic data stream 118 can be sent through multiple objects which might be co-located or arranged in different locations within the connected home premises. Thus, in some embodiments, the RF repeater system 112 includes a plurality of nodes, each of which can be configured the same as or similar to the single node implementation shown and described with reference to the illustrated embodiment. Each node in the RF repeater system can include a plurality of hardware components configured in accordance with a circuit designed to perform the aforementioned operations. In some embodiments, the circuit utilizes one or more commercial off-the-shelf ("COTS") components, including one or more integrated circuits, one or more RF receivers, one or more RF transmitters, one or more power amplifiers, one or more differential amplifiers, one or more data slicers, one or more surface transducers, one or more resistors, one or more capacitors, one or more power sources, one or more light emitting diodes ("LEDs"), other circuit components, combinations thereof, and/or the like. The circuit alternatively can be encoded in software and executed by a processor of the RF frequency repeater system. The circuit alternatively can be embodied as an application-specific integrated circuit ("ASIC"). The circuit alternatively can be embodied as a field-programmable gate array ("FPGA"). Moreover, those skilled in the art will appreciate the wide range of circuit designs that can be configured to perform the aforementioned operations. As such, any particular design elements described herein are not intended to be limiting in any way. An example circuit design of the RF repeater system 112 is illustrated in FIG. 9.

The connected home controller 106 is illustrated as being capable of operating on and in communication with a wireless access network 126. The wireless access network 126 can include one or more radio access networks ("RANs"). A RAN can utilize various channel access methods including, but not limited to, Time Division Multiple Access ("TDMA"), Frequency Division Multiple Access ("FDMA"), Single Carrier FDMA ("SC-FDMA"), Code Division Multiple Access ("CDMA"), wideband CDMA ("W-CDMA"), Orthogonal Frequency Division Multiplexing ("OFDM"), Space Division Multiple Access ("SDMA"), and/or the like to provide a radio/air interface to the connected home controller 106 and to the user device 110. Data communications can be provided in part by General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), Long-Term Evolution ("LTE"), and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like. A RAN can include various components such as, but not limited to, base transceiver stations ("BTSs"), Node-Bs or e-Node-Bs, base station controllers ("BSCs"), radio network controllers ("RNCs"), The illustrated wireless access network 126 is in communication with a wireless core network 128. The wireless core network 128 can be or can an evolved packet core ("EPC"), a circuit-switched core network ("CS CN"), a packet-switched core network ("PS CN"), an IP multimedia subsystem ("IMS") core network, multiples thereof, and/or combinations thereof. The wireless core network 128 can utilize one or more mobile telecommunications technologies, such as, but not limited to, Global System for Mobile communications ("GSM"), CDMA ONE, CDMA2000, Universal Mobile Telecommunications System ("UMTS"), LTE, Worldwide Interoperability for Microwave Access ("WiMAX"), other 802.XX technologies (e.g., 802.11 WI-FI), and the like.

In embodiments that the wireless core network 128 includes an EPC, the wireless core network 128 can include one or more mobility management entities ("MMEs"), one or more serving gateways ("SGWs"), one or more packet data networks ("PDN") gateways ("PGWs"), and one or more home subscriber servers ("HSSs"). An MME controls signaling related to mobility and security for E-UTRAN access such as via the wireless access network 126. An SGW provides a point of interconnect between the radio-side (e.g., the wireless access network 126) and the EPC network (e.g., the wireless core network 128). An SGW serves the connected home controller 106 and the user device 110 by routing incoming and outgoing IP packets, including, for example, IP packets containing data provided by the connected home device(s) 104. A PGW interconnects the wireless core network 128 and one or more external IP networks (not shown). A PGW routes IP packets to and from the external IP networks. A PGW also performs operations such as IP address/IP prefix allocation, policy control, and charging. In some implementations, a PGW and an SGW are combined. An HSS is a database that contains user/subscriber information. An HSS also performs operations to support mobility management, call and session setup, user authentication, and access authorization.

The connected home controller 106 also is illustrated as being capable of operating on and in communication with a wireline network 130 via a wireline communications link. The wireline network 130 can be or can include one or more packet-switched networks. The wireline network 130 can provide a backbone network for the wireless core network 128. The wireline communications link can be or can include any wireline cabling, some examples of which include coaxial cable and fiber optic cable. Those skilled in the art will appreciate the functionality of wireline networks, and as such, additional details in this regard are not described herein.

The wireline network 130 is also shown as being in communication with a monitoring center 132, which, in turn, is in communication with one or more emergency services 134. The monitoring center 132 can monitor the connected home controller 106 for emergency events (e.g., intruder, water leak, fire alarm, and/or the like) based upon data provided by the connected home device(s) 104. In response to detecting an emergency event, personnel associated with the monitoring center 132 can communicate with the emergency services 134 on behalf of the user 108 to dispatch the police, fire, and/or emergency medical authorities to the connected home premises 102. Additionally, the monitoring center 132 can provide a notification of the dispatch to the user device 110 and/or the connected home controller 106 to notify the user 108 that emergency authorities have been dispatched to the connected home premises 102. The notification can include a telephone call, a text message, an application notification, a combination thereof, and/or the like.

The monitoring center 132 also is in communication with a connected home customer data center ("customer data center") 136. The customer data center 136 can store one or more accounts 138 associated with customers, such as the user 108, of the connected home service. The account(s) 138 can include personal information such as name, service address, billing address, telephone number, e-mail address, service description, billing information, and any other information associated with customers of the connected service.

It should be understood that some implementations of the operating environment 100 include multiple connected home premises 102, multiple connected home device 104, multiple connected home controllers 106, multiple users 108, multiple user devices 110, multiple RF repeater systems 112, multiple objects 114, multiple original RF signals 116, multiple ultrasonic data stream 118, multiple RF signals 124, multiple wireless access network 126, multiple wireless core network 128, multiple wireline network 130, multiple monitoring centers 132, multiple customer data centers 136, or some combination thereof. Thus, the illustrated embodiment should be understood as being illustrative, and should not be construed as being limiting in any way.

Figure 2:
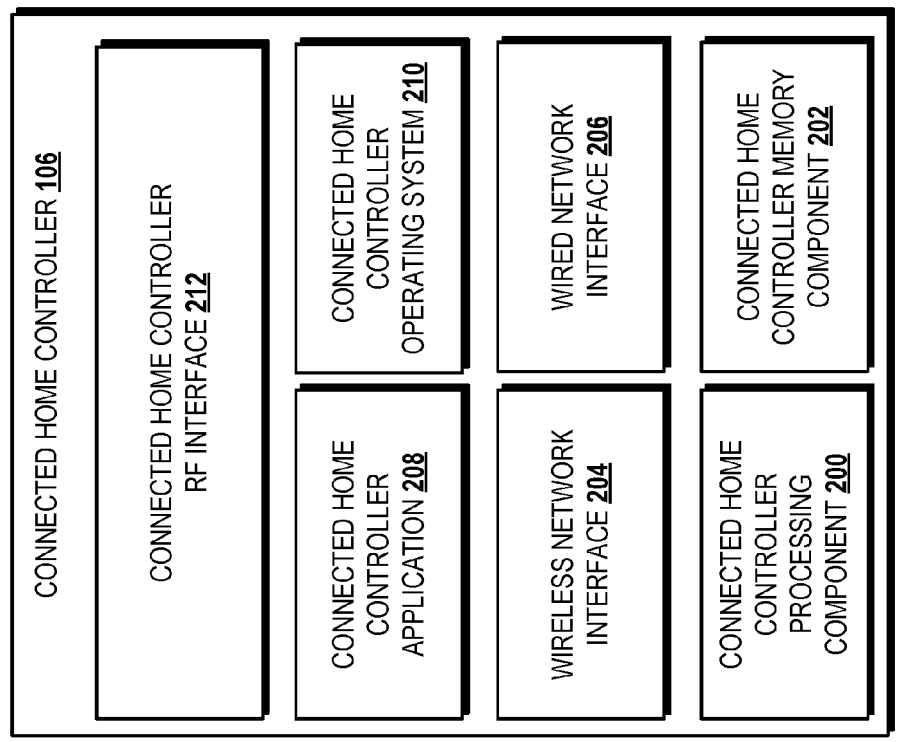
FIG. 2 is a block diagram illustrating an example connected home controller capable of implementing aspects of the embodiments presented herein.

Turning now to FIG. 2, a block diagram illustrating an example of the connected home controller 106 that is capable of implementing aspects of the embodiments presented herein will be described. The illustrated connected home controller 106 includes a connected home controller processing component 200, a connected home controller memory component 202, a wireless network interface 204, a wired network interface 206, a connected home controller application 208, a connected home controller operating system 210, and a connected home controller RF interface 212. FIG. 2 will be described with additional reference to FIG. 1.

The connected home controller processing component 200 can include one or more hardware components that perform computations to process data, and/or to execute computer-executable instructions of one or more application programs such as the connected home controller application 208, one or more operating systems such as the connected home controller operating system 210, and/or other software. The connected home controller processing component 200 can include one or more central processing units ("CPUs") configured with one or more processing cores. The connected home controller processing component 200 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the connected home controller processing component 200 can include one or more discrete GPUs. In some other embodiments, the connected home controller processing component 200 can include CPU and GPU components that are configured in accordance with a co-processing CPU/GPU computing model, wherein the sequential part of an application executes on the CPU and the computationally-intensive part is accelerated by the GPU. The connected home controller processing component 200 can include one or more system-on-chip ("SoC") components along with one or more other components illustrated as being part of the connected home controller 106, including, for example, the connected home controller memory component 202. In some embodiments, the connected home controller processing component 200 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The connected home controller processing component 200 can be or can include one or more hardware components architected in accordance with an ARM architecture, available for license from ARM HOLDINGS of Cambridge, United Kingdom. Alternatively, the connected home controller processing component 200 can be or can include one or more hardware components architected in accordance with an x86 architecture, such an architecture available from INTEL CORPORATION of Mountain View, Calif., and others. Those skilled in the art will appreciate the implementation of the connected home controller processing component 200 can utilize various computation architectures, and as such, the connected home controller processing component 200 should not be construed as being limited to any particular computation architecture or combination of computation architectures, including those explicitly disclosed herein.

The connected home controller memory component 202 can include one or more hardware components that perform storage operations, including temporary or permanent storage operations. In some embodiments, the connected home controller memory component 202 include volatile and/or non-volatile memory implemented in any method or technology for storage of information such as computer-readable instructions, data structures, program modules, the connected home controller operating system 210, the connected home controller application 208, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the connected home controller processing component 200.

The wireless network interface 204 can include one or more antennas, one or more receivers, and one or more transmitters for facilitating communication with the wireless access network 126. As such, the wireless network interface 204 can be configured in accordance with any proprietary or standardized wireless communications technologies, some examples of which include the technologies described herein above with respect to the wireless access network 126. Alternatively or additionally (e.g., dual-mode configuration), the wireless network interface 204 can include an interface that operates in accordance with Institute of Electrical and Electronic Engineers ("IEEE") 802.11 standards, such as IEEE 802.11a, 802.11b, 802.11g, 802.11n, and draft/future 802.11 standards (referred to herein collectively as WI-FI), BLUETOOTH, wireless USB, Z-Wave, ZIG-BEE, or the like to communicate with an external interface, such as a modem, that, in turn, connects to the wireless access network 126.

The wired network interface 206 can include hardware for facilitating communication with the wireline network 130. The wired network interface 206 can be or can include a proprietary wired interface or a standardized wired interface such as Ethernet, High Definition Media Interface ("HDMI"), Universal Serial Bus ("USB"), or the like. The wired network interface 206 can provide a direct connection to the wireline network 130, or can provide a connected to an external interface, such as a modem, that, in turn, connects to the wireline network 130.

The connected home controller application 208 can be executed by the connected home controller processing component 200 to perform operations to provide, at least, in part, the connected home service to the user 108. The connected home controller application 208 can provide a user interface (not shown) accessible by the user 108 via the user device 110 via a dedicated application and/or via a web browser, and, in some embodiments, directly on the connected home controller 106. In the latter embodiment, the connected home controller 106 can include or can be connected to one or more displays (also not shown) configured to present in a visual manner the user interface. The user interface, whether accessed remotely via the user device 110 or directly on the connected home controller 106 can receive input from the user 108 to control the connected home devices 104, including powering on/off, configuring settings, updating software/firmware, and otherwise controlling operations of the connected home devices 104.

The connected home controller operating system 210 can control the operation of the connected home controller 106. In some embodiments, the connected home controller operating system 210 includes the functionality of the connected home controller application 208. The connected home controller operating system 210 can be executed by the connected home controller processing component 200 to cause the connected home controller 106 to perform various operations. The connected home controller operating system 210 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The connected home controller RF interface 212 can include one or more antennas and one or more RF receivers for receiving RF signals, such as the RF signal 124, from one or more surface transducers, such as the surface transducerN 120N in the embodiment shown in FIG. 1.

It should be understood that some implementations of the connected home controller 106 can include multiple connected home controller processing components 200, multiple connected home controller memory components 202, multiple wireless network interfaces 204, multiple wired network interfaces 206, multiple connected home controller applications 208, multiple connected home controller operating systems 210, multiple connected home controller RF interfaces 212, or some combination thereof. Thus, the illustrated embodiment should be understood as being illustrative, and should not be construed as being limiting in any way.

Figure 3:
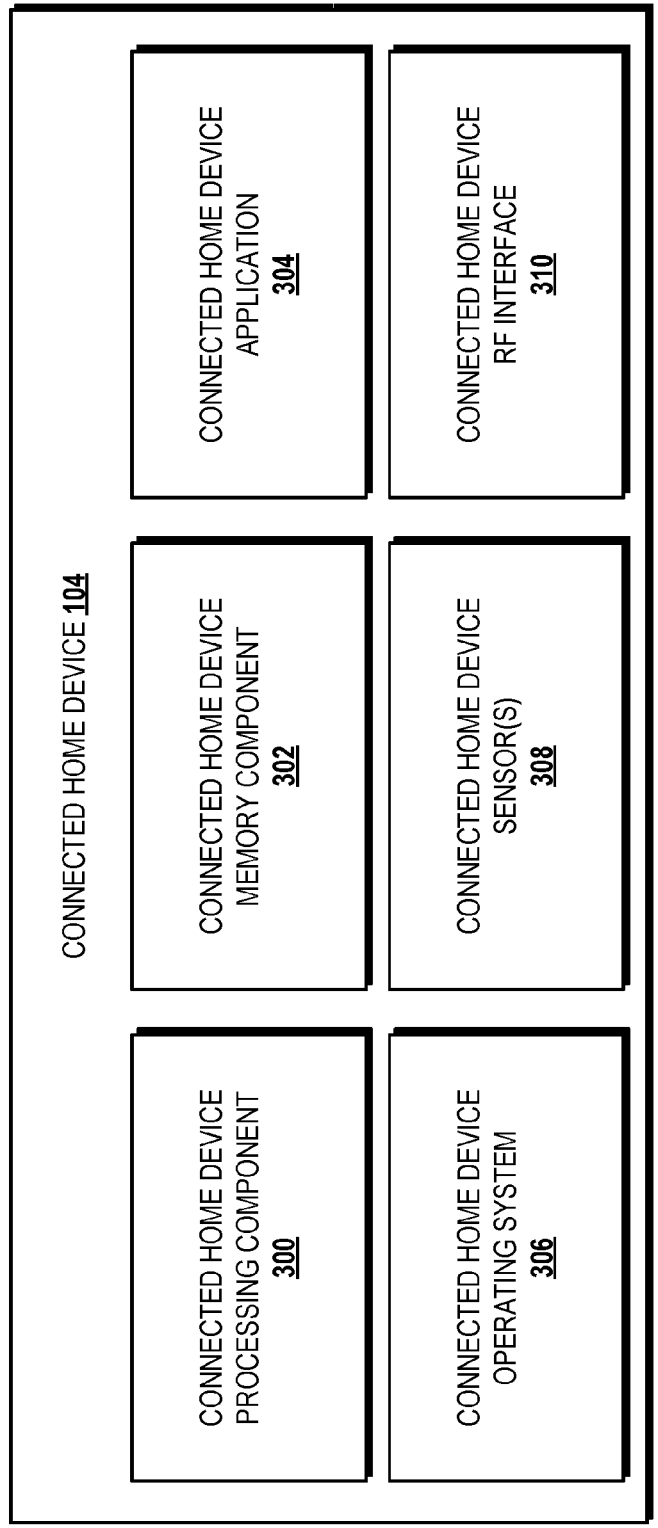
FIG. 3 is a block diagram illustrating an example connected home device capable of implementing aspects of the embodiments presented herein.

Turning now to FIG. 3, a block diagram illustrating an example of the connected home device 104 capable of implementing aspects of the embodiments presented herein will be described. The illustrated connected home device 104 includes a connected home device processing component 300, a connected home device memory component 302, a connected home device application 304, a connected home device operating system 306, one or more connected home device sensors 308, and a connected home device RF interface 310. FIG. 3 will be described with additional reference to FIG. 1.

The connected home device processing component 300 can include one or more hardware components that perform computations to process data, and/or to execute computer-executable instructions of one or more application programs such as the connected home device application 304, one or more operating systems such as the connected home operating system 306, and/or other software. The connected home processing component 300 can include one or more CPUs configured with one or more processing cores. The connected home device processing component 300 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the connected home device processing component 300 can include one or more discrete GPUs. In some other embodiments, the connected home device processing component 300 can include CPU and GPU components that are configured in accordance with a co-processing CPU/GPU computing model, wherein the sequential part of an application executes on the CPU and the computationally-intensive part is accelerated by the GPU. The connected home device processing component 300 can include one or more SoC components along with one or more other components illustrated as being part of the connected home device 104, including, for example, the connected home device memory component 302. In some embodiments, the connected home processing component 300 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The connected home processing component 300 can be or can include one or more hardware components architected in accordance with an ARM architecture, available for license from ARM HOLDINGS of Cambridge, United Kingdom. Alternatively, the connected home processing component 300 can be or can include one or more hardware components architected in accordance with an x86 architecture, such an architecture available from INTEL CORPORATION of Mountain View, Calif., and others. Those skilled in the art will appreciate the implementation of the connected home processing component 300 can utilize various computation architectures, and as such, the connected home processing component 300 should not be construed as being limited to any particular computation architecture or combination of computation architectures, including those explicitly disclosed herein.

The connected home memory component 302 can include one or more hardware components that perform storage operations, including temporary or permanent storage operations. In some embodiments, the connected home memory component 302 include volatile and/or non-volatile memory implemented in any method or technology for storage of information such as computer-readable instructions, data structures, program modules, the connected home device operating system 306, the connected home device application 304, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the connected home device processing component 300.

The connected home device application 304 can be executed by the connected home device processing component 300 to perform operations to provide, at least, in part, the connected home service to the user 108. The connected home device application 304 can provide a user interface (not shown) accessible by the user 108 via the user device 110 via a dedicated application and/or via a web browser, and, in some embodiments, directly on the connected home device 104. In the latter embodiment, the connected home device 104 can include or can be connected to one or more displays (also not shown) configured to present in a visual manner the user interface. The user interface, whether accessed remotely via the user device 110 or directly on the connected home device 104 can receive input from the user 108 to control the connected home device 104, including powering on/off, configuring settings, updating software/firmware, and otherwise controlling operations of the connected home device 104.

The connected home device operating system 306 can control the operation of the connected home device 104. In some embodiments, the connected home device operating system 306 includes the functionality of the connected home device application 304. The connected home device operating system 306 can be executed by the connected home device processing component 300 to cause the connected home device 104 to perform various operations. The connected home device operating system 306 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The connected home device sensor(s) 308 can include any sensor type or combination of sensor types utilizing any known sensor technology that is capable of detecting one or more characteristics of an environment, such as at least part of the connected home premises 102, in which the connected home device 104 is deployed. More particularly, the connected home device sensor(s) 308 can include, for example, a smoke detector, a motion detector, a vibration sensor, an orientation sensor, a door sensor, a window sensor, a window break sensor, an outlet controller sensor, a water leak sensor, a fall detector, a flood detector, an alarm sensor, an environment control sensor, a carbon monoxide detector, a medication dispenser sensor, an entry/exit detector, a natural gas detector, a pressure sensor, an occupancy sensor, a smart home device sensor, a temperature sensor, a humidity sensor, a doorbell sensor, a multipurpose sensor that combines two or more sensors, the like, and/or combinations thereof. The sensor(s) can be utilized, at least in part, to provide sensor data (e.g., data indicative of motion detection, a door being opened, smoke or carbon monoxide present, a doorbell ring, and/or the like) for use in providing the connected home service to the user 108. Those skilled in the art will appreciate the applicability of the connected home device sensors 308 to various aspects of connected home services, and for this reason, additional details in this regard are not provided.

The connected home device RF interface 310 can include an RF transceiver or separate receiver and transmitter components. The connected home device RF interface 310 can transmit the original RF signal 116 (best shown in FIG. 1) to the RF repeater system 112. The connected home device RF interface 310 also can transmit RF signals directly to the connected home controller 106 for implementations in which the RF repeater system 112 is not needed—that is, no RF shielding object(s) or other obstacles are positioned between the connected home device 104 and the connected home controller 106.

It should be understood that some implementations of the connected home device 104 can include multiple connected home device processing components 300, multiple connected home device memory components 302, multiple connected home device applications 304, multiple connected home device operating systems 306, multiple connected home device RF interfaces 310, or some combination thereof. Thus, the illustrated embodiment should be understood as being illustrative, and should not be construed as being limiting in any way.

Figure 4:
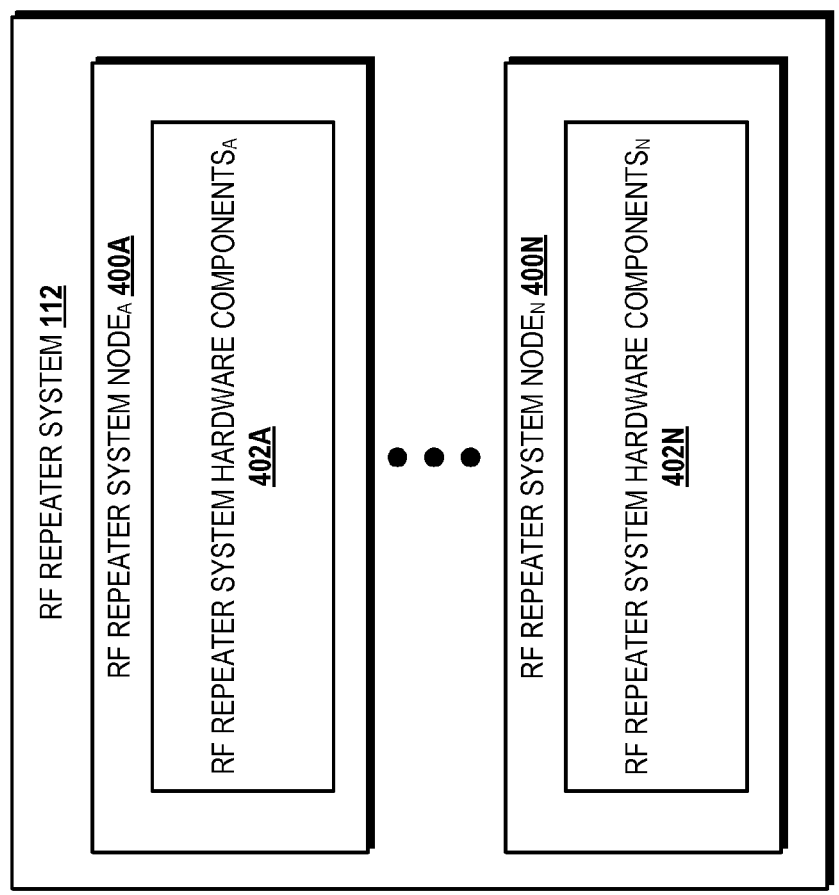
FIG. 4 is a block diagram illustrating an example RF repeater system capable of implementing aspects of the embodiments presented herein.

Turning now to FIG. 4, a block diagram illustrating an example of the RF repeater system 112 capable of implementing aspects of the embodiments presented herein will be described. The illustrated RF repeater system 112 includes a plurality of RF repeater system nodes 400A-400N (collectively, RF repeater system nodes 400). In the illustrated example, the RF repeater system 112 includes an RF repeater system nodeA 400A and an RF repeater system nodeN 400N. Implementations of the RF repeater system 112 can include any number of nodes.

Each node 400 in the RF repeater system 112 can include a plurality of hardware components configured in accordance with a circuit designed to perform the RF repeater operations described herein. In some embodiments, the circuit utilizes one or more COTS components, including one or more integrated circuits, one or more resistors, one or more capacitors, one or more power sources, one or more LEDs, other circuit components, combinations thereof, and/or the like. The circuit alternatively can be encoded in software and executed by a processor of the RF repeater system 112. The circuit alternatively can be embodied as an application-specific integrated circuit ASIC. The circuit alternatively can be embodied as a FPGA. Moreover, those skilled in the art will appreciate the wide range of circuit designs that can be configured to perform the aforementioned operations. As such, any particular design elements described herein are not intended to be limiting in any way.

In the illustrated embodiment, the RF repeater system nodeA 400A includes RF repeater system hardware componentsA 402A and the RF system nodeN 400N includes RF repeater system hardware componentsN 402N. The RF repeater system hardware components 402 can include one or more RF receivers, one or more RF transmitters, one or more surface transducers (e.g., the surface transducers 120), one or more signal demodulators, one or more signal modulators, one or more signal amplifiers, one or more signal data slicers, combinations thereof, and/or the like to perform the RF repeater operations described herein, such as, for example, below with reference to FIG. 5.

Figure 5:
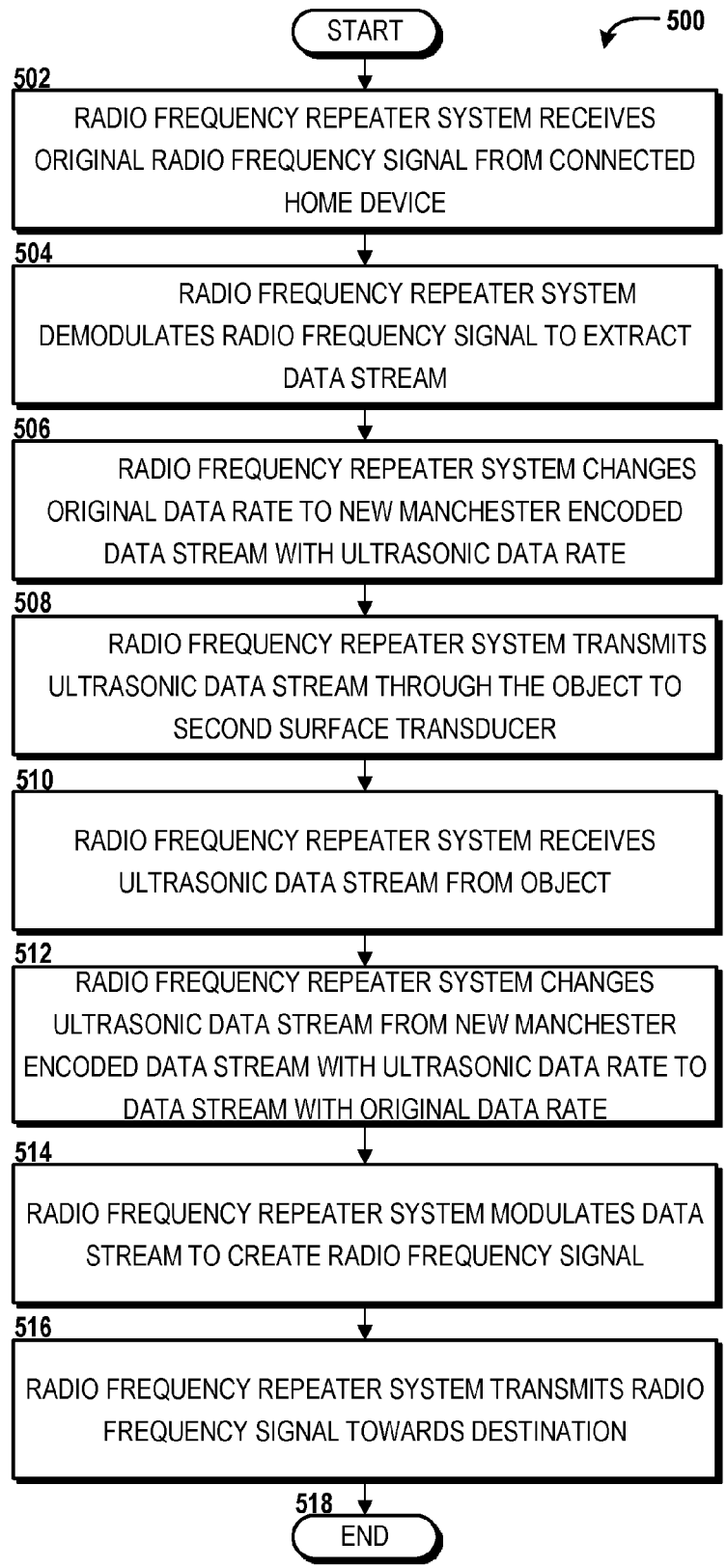
FIG. 5 is a flow diagram illustrating aspects of a method for operating an RF repeater system, according to an illustrative embodiment.

Turning now to FIG. 5, aspects of a method 500 for operating the RF repeater system 112 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the RF repeater system 112, the connected home controller 106, the connected home device 104, the user device 110, single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device to perform one or more operations and/or causing the processor to direct other components of the computing system or device to perform one or more of the operations.

The method 500 will be described with reference to FIG. 5 and further reference to FIGS. 1-4. The method 500 begins at operation 502, where the RF repeater system 112 receives the original RF signal 116 from the connected home device 104. The original RF signal 116 contains a data stream, including data captured by the connected home device 104 and intended for delivery to the connected home controller 106 to provide, at least in part, a connected home service to the user 108.

From operation 502, the method 500 proceeds to operation 504, where the RF repeater system 112 demodulates the original RF signal 116 to extract the data stream. From operation 504, the method 500 proceeds to operation 506, where the RF repeater system 112 changes the original data rate of the data stream to a new Manchester encoded data stream with an ultrasonic, and thereby creating the ultrasonic data stream 118 that is capable of propagating through the object 114. From operation 506, the method 500 proceeds to operation 508, where the RF repeater system 112 transmits, via a first surface transducer, such as the surface transducers 120A, the ultrasonic data stream 118 through the object 114 to a second surface transducer, such as the surface transducerN 120N. From operation 508, the method 500 proceeds to operation 510, where the RF repeater system 112 receives, via the second surface transducer, the ultrasonic data stream 118 from the object 114.

From operation 510, the method 500 proceeds to operation 512, where the RF repeater system 112 changes the ultrasonic data stream 118 from the new Manchester encoded data stream with the ultrasonic data rate back to the data stream with the original data rate. From operation 512, the method 500 proceeds to operation 514, where the RF repeater system 112 modulates, via an RF modulator, the data stream to create the RF signal 124. From operation 514, the method 500 proceeds to operation 516, where the RF repeater system 112 transmits the RF signal 124 towards a destination, such as the connected home controller 106 or another node in the RF repeater system 112. From operation 516, the method 500 proceeds to operation 518, where the method 500 ends.

Figure 6:
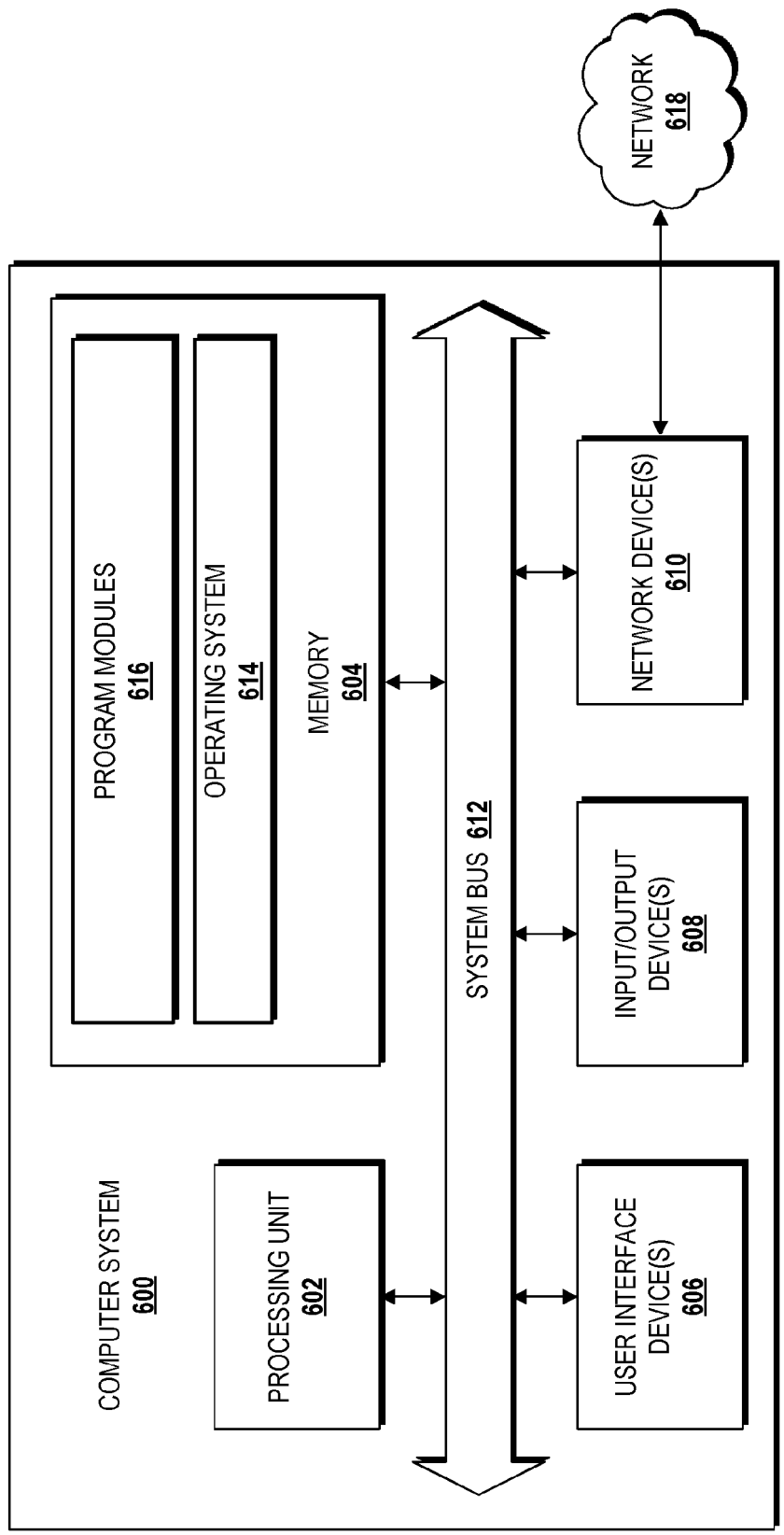
FIG. 6 is a block diagram illustrating an example computer system capable of implementing aspects of the embodiments presented herein.

FIG. 6 is a block diagram illustrating a computer system 600 configured to provide the functionality in accordance with various embodiments of the concepts and technologies disclosed herein. In some implementations, one or more of the systems and/or device disclosed herein utilize an architecture that is the same as or similar to the architecture of the computer system 600. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform one or more operations. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 618, such as the wireless access network 126 and/or the wireline network 130. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 618 may be a wired network such as, but not limited to, a wide area network ("WAN"), a wired LAN such as provided via Ethernet, a wired personal area network n ("PAN"), or a wired metropolitan area network ("MAN").

Figure 7:
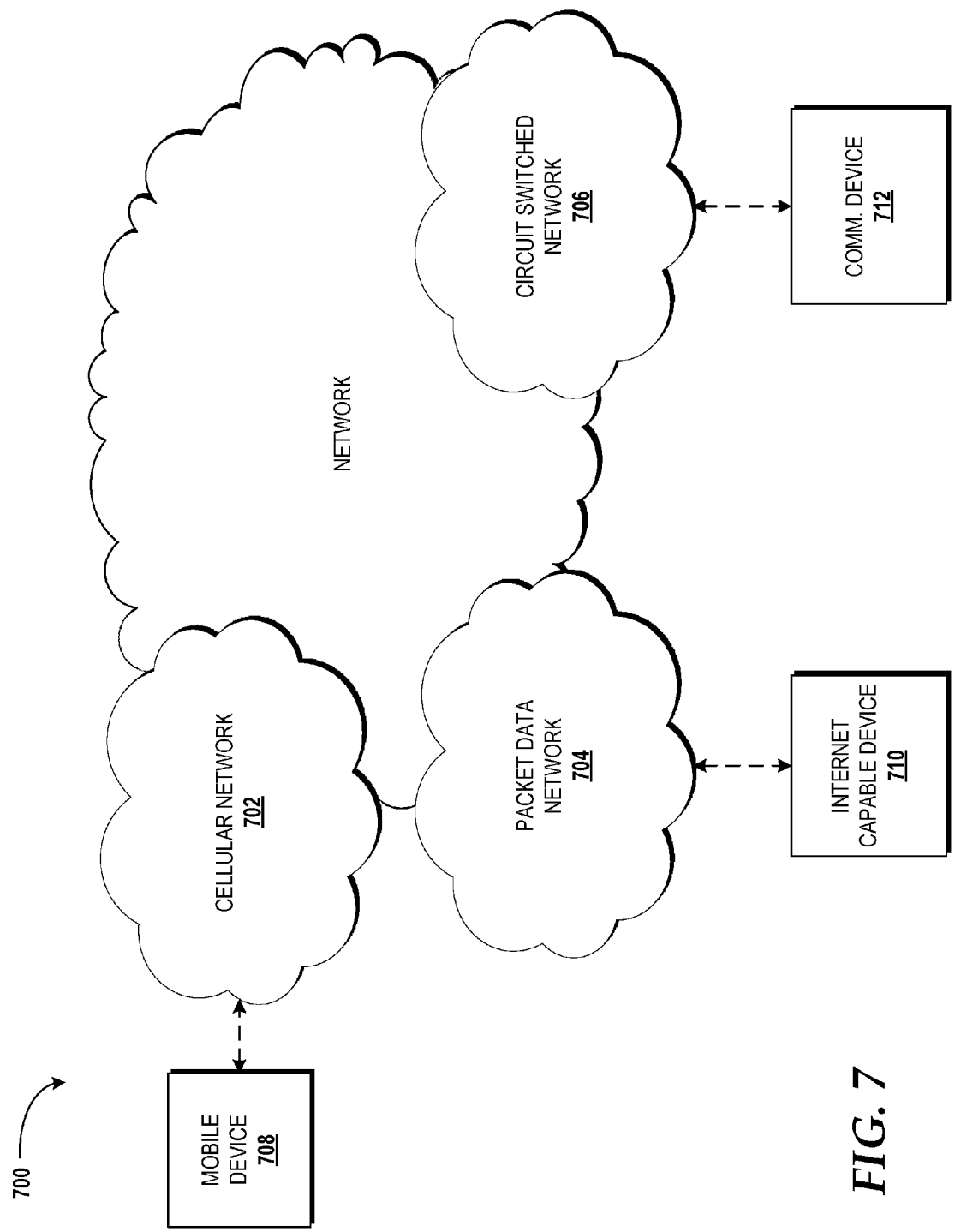
FIG. 7 schematically illustrates a network, according to an illustrative embodiment.

Turning now to FIG. 7, additional details of a network 700 are illustrated, according to an illustrative embodiment. The network 700 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the user device 110, a cellular telephone, a user equipment, a mobile terminal, a PDA, a laptop computer, a handheld computer, and combinations thereof, can be operatively connected to a cellular network. The cellular network 702 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 702 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 702 also is compatible with 4G mobile communications standards such as Long-Term Evolution ("LTE"), or the like, as well as evolved and future mobile standards.

The packet data network 704 includes various devices, for example, servers, computers, databases, and other devices in communication with another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with a packet data network through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 700 is used to refer broadly to any combination of the networks 702, 704, 706. It should be appreciated that substantially all of the functionality described with reference to the network 700 can be performed by the cellular network 702, the packet data network 704, and/or the circuit switched network 706, alone or in combination with other networks, network elements, and the like.

Figure 8:
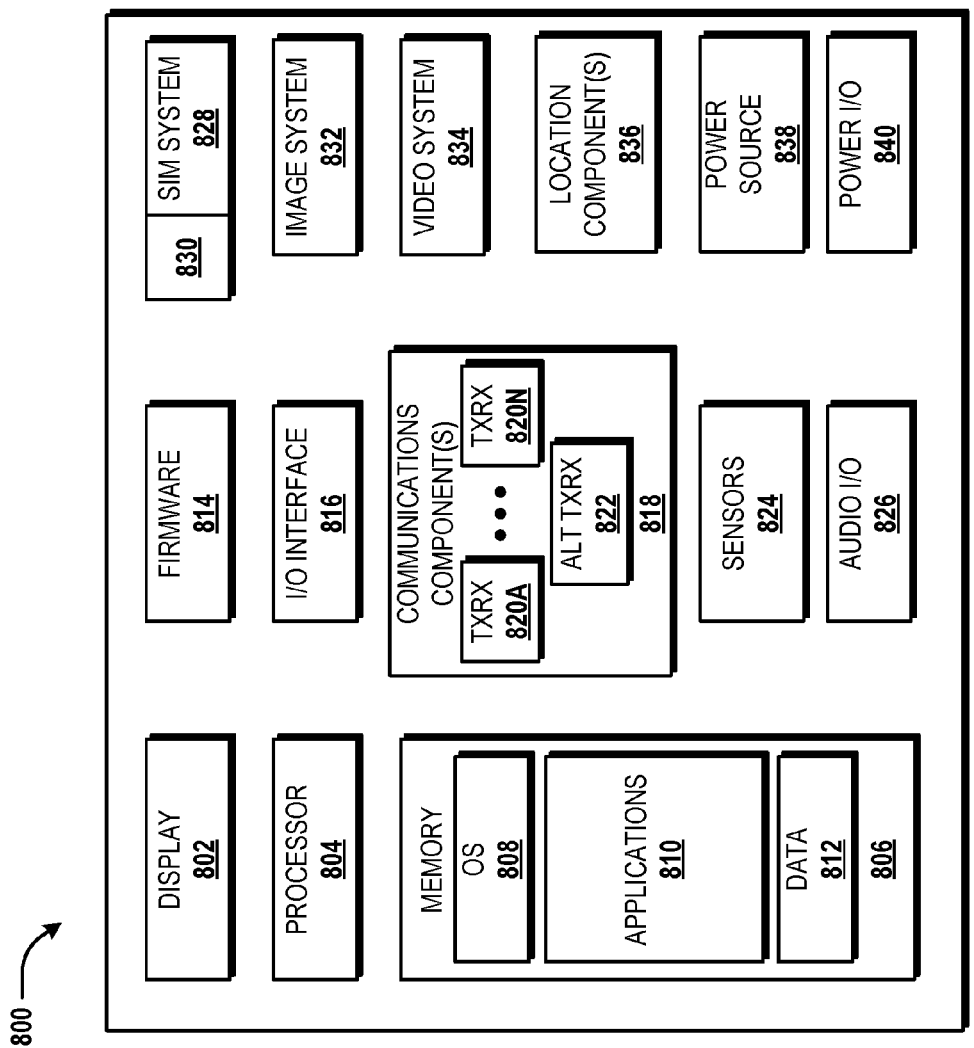
FIG. 8 is a block diagram illustrating an example mobile device and components thereof, according to an illustrative embodiment.

Turning now to FIG. 8, an illustrative mobile device 800 and components thereof will be described. In some embodiments, the user device 110 can be configured as and/or can have an architecture similar or identical to the mobile device 800 described herein in FIG. 8. It should be understood, however, user device 110 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800.

According to various embodiments, the applications 810 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMA, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, A-GPS devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Referring now to FIG. 9, a block diagram illustrating an example circuit design 900 for the RF repeater system 112, according to an illustrative embodiment. The circuit design 900 utilizes COTS parts, including surface transducers ("ST"), differential amplifiers ("DA"), data slicers ("DS"), RF radios, protocol chips ("PCHIP"), and power amplifiers ("PA"). Those skilled in the art will appreciate the applicability of the circuit design 900 to implementing the RF repeater system 112. It should be understood, however, that other circuit designs can be utilized to implement the RF repeater system 112. As such, the circuit design 900 should not be construed as being limiting in any way.

Based on the foregoing, it should be appreciated that concepts and technologies directed to an RF repeater system for signal transmission through RF shielding material in connected home applications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
receiving, by a radio frequency repeater system, an original radio frequency signal, wherein the original radio frequency signal is unable to propagate through an object, and wherein the object comprises a first surface upon which a first surface transducer of the radio frequency repeater system is attached and a second surface upon which a second surface transducer of the radio frequency repeater system is attached;
demodulating, by the radio frequency repeater system, the original radio frequency signal to extract a data stream comprising data and an original data rate; and
changing, by the radio frequency repeater system, the data stream to a new data stream with an ultrasonic data rate, wherein the new data stream is capable of propagating through the object.

2. The method of claim 1, further comprising:
transmitting, by the first surface transducer of the radio frequency repeater system, the new data stream with the ultrasonic data rate through the object to the second surface transducer;
receiving, by the second surface transducer of the radio frequency repeater system, the new data stream with the ultrasonic data rate from the object;
changing, by the radio frequency repeater system, the new data stream from the ultrasonic data rate back to the original data rate, thereby returning the new data stream to the data stream;
modulating, by the radio frequency repeater system, the data stream to create a radio frequency signal representative of the original radio frequency signal; and
transmitting, by the radio frequency repeater system, the radio frequency signal towards a destination.

3. The method of claim 1, wherein the new data stream comprises a Manchester encoded data stream.

4. The method of claim 1, wherein the data comprises data associated with a connected home service.

5. The method of claim 1, wherein the object comprises a wall made of a material through which the original radio frequency signal is unable to propagate.

6. A radio frequency repeater system comprising:
a receiver component that receives an original radio frequency signal, wherein the original radio frequency signal is unable to propagate through an object, and wherein the object comprises a first surface and a second surface;
a first surface transducer attached to the first surface of the object;
a second surface transducer attached to the second surface of the object;
a demodulator component that demodulates the original radio frequency signal to extract a data stream comprising data; and
a processing component that changes an original data rate of the data stream to an ultrasonic data rate thereby creating an ultrasonic data stream that is capable of propagating through the object.

7. The radio frequency repeater system of claim 6, wherein the first surface transducer transmits the ultrasonic data stream through the object to the second surface transducer; and wherein the second surface transducer receives the ultrasonic data stream from the object.

8. The radio frequency repeater system of claim 7, wherein the processing component changes the ultrasonic data stream from the ultrasonic data rate back to the original data rate, thereby returning the ultrasonic data stream to the data stream.

9. The radio frequency repeater system of claim 8, wherein the demodulator component modulates the data stream to create a radio signal representative of the original radio frequency signal.

10. The radio frequency repeater system of claim 9, further comprising a transmitter component that transmits the original radio frequency signal towards a destination.

11. The radio frequency repeater system of claim 6, wherein the data comprises data associated with a connected home service.

12. The radio frequency repeater system of claim 6, wherein the ultrasonic data stream comprises a Manchester encoded data stream.

13. A computer-readable storage medium comprising computer-executable instructions that, when executed by a processor of a radio frequency repeater system, causes the radio frequency repeater system performs operations comprising:
receiving an original radio frequency signal, wherein the original radio frequency signal is unable to propagate through an object, and wherein the object comprises a first surface upon which a first surface transducer of the radio frequency repeater system is attached and a second surface upon which a second surface transducer of the radio frequency repeater system is attached;
demodulating the original radio frequency signal to extract a data stream comprising data and an original data rate; and
changing the data stream to a new data stream with an ultrasonic data rate, wherein the new data stream is capable of propagating through the object.

14. The computer-readable storage medium of claim 13, wherein the operations further comprise
causing the first surface transducer to transmit the new data stream through the object to the second surface transducer; and
causing the second surface transducer of the radio frequency repeater system to receive the new data stream from the object.

15. The computer-readable storage medium of claim 14, wherein the operations further comprise changing the new data stream from the ultrasonic data rate back to the original data rate, thereby returning the new data stream to the data stream.

16. The computer-readable storage medium of claim 15, wherein the operations further comprise modulating the data stream to create a radio frequency signal representative of the original radio frequency signal.

17. The computer-readable storage medium of claim 16, wherein the operations further comprise transmitting the original radio frequency signal towards a destination.

18. The computer-readable storage medium of claim 17, wherein the destination comprises a connected home controller.

19. The computer-readable storage medium of claim 18, wherein the data comprises data associated with a connected home service provided, at least in part, via the connected home controller.

20. The computer-readable storage medium of claim 13, wherein the new data stream comprises a Manchester encoded data stream.

* * * * *